(12) United States Patent
Steigelfest et al.

(10) Patent No.: US 11,794,119 B2
(45) Date of Patent: Oct. 24, 2023

(54) INTELLIGENT PRIORITIZATION AND MANIPULATION OF STREAM VIEWS

(71) Applicant: SUPER LEAGUE GAMING, INC., Santa Monica, CA (US)

(72) Inventors: David Steigelfest, Santa Monica, CA (US); Arthur Kmbikyan, Santa Monica, CA (US); Brian Gramo, Santa Monica, CA (US)

(73) Assignee: SUPER LEAGUE GAMING, INC., Santa Monica, CA (US)

(*) Notice: Subject to any disclaimer, the term of this patent is extended or adjusted under 35 U.S.C. 154(b) by 375 days.

(21) Appl. No.: 17/188,913

(22) Filed: Mar. 1, 2021

(65) Prior Publication Data
US 2022/0274026 A1 Sep. 1, 2022

(51) Int. Cl.
*A63F 13/86* (2014.01)
*A63F 13/335* (2014.01)
*G06N 20/00* (2019.01)

(52) U.S. Cl.
CPC ............ *A63F 13/86* (2014.09); *A63F 13/335* (2014.09); *G06N 20/00* (2019.01)

(58) Field of Classification Search
CPC ........ A63F 13/67; A63F 13/335; A63F 13/35; A63F 13/86; G06N 20/00
See application file for complete search history.

(56) References Cited

U.S. PATENT DOCUMENTS

| | | | |
|---|---|---|---|
| 10,368,132 B2* | 7/2019 | Barlaskar | H04N 21/4788 |
| 10,814,228 B2* | 10/2020 | Trombetta | A63F 13/67 |
| 10,953,335 B2* | 3/2021 | Thielbar | A63F 13/795 |
| 2018/0139257 A1* | 5/2018 | Ninoles | H04L 65/1089 |
| 2018/0250600 A1* | 9/2018 | Trombetta | A63F 13/5252 |
| 2019/0240586 A1* | 8/2019 | Taylor | A63F 13/85 |
| 2019/0262724 A1* | 8/2019 | Trombetta | A63F 13/86 |
| 2020/0101382 A1* | 4/2020 | Wheeler | A63F 13/52 |
| 2021/0205702 A1* | 7/2021 | Sanders | A63F 13/525 |
| 2021/0354036 A1* | 11/2021 | Swann | G06T 15/04 |
| 2021/0370186 A1* | 12/2021 | Ye | A63F 13/213 |
| 2021/0387089 A1* | 12/2021 | McCoy | A63F 13/35 |
| 2022/0203228 A1* | 6/2022 | Wiggeshoff | A63F 13/79 |
| 2023/0149819 A1* | 5/2023 | Pandhare | H04L 65/75 |
| | | | 709/217 |

* cited by examiner

Primary Examiner — James S. McClellan
Assistant Examiner — Ross A Williams
(74) *Attorney, Agent, or Firm* — POLSINELLI LLP (57) ABSTRACT

The present technology provides a mechanism for assisting in generating a prioritized view of an in-game environment of a game session of a game title by establishing and propagating the prioritized view to spectator devices, the game session played by user devices controlling characters in the in-game environment. The prioritized view is intelligently determined based on in-game indicators associated with each respective game view at the user devices.

19 Claims, 6 Drawing Sheets

INTELLIGENT PRIORITIZATION AND MANIPULATION OF STREAM VIEWS

BACKGROUND OF THE INVENTION

1. Field of the Invention

The present technology pertains to intelligently prioritizing and manipulating in-stream views of a digital environment. More particularly, the present technology is related to generation and customization of prioritized game views based on an intelligently-determined prioritization queue using in-game indicators associated with each respective game view.

2. Description of the Related Art

Streaming content can be displayed from various perspectives in an in-stream digital or virtual environment. Multiplayer games, for example, may be associated with as many different in-game or in-stream views as there are players. That is because many multiplayer game titles may provide each player with a first-person view (e.g., associated with a user character or avatar) of the in-game digital environment. Many digital content titles may not just be of interest to participating users, however, but may further have a wider audience of spectators who may or may not be currently engaging within the digital environment.

Where multiple different perspectives of a digital environment are available during a current session, a spectator may be provided with one or more of the available views. Providing a display to a spectator may involve selecting and switching from among dozens, hundreds, or even thousands of different perspective views. Such selection and switching has historically been performed based on manual instruction from a human producer (or human production team). For example, the human producer(s) may access and watch each of the individual streams corresponding to the different available perspectives in order to make selections and switching decisions. Such involvement may be increasingly time-consuming and difficult, however, where there are many different streams, in-stream events, and perspective views to evaluate. Thus, streams corresponding to potentially significant events may be overlooked, and/or switching decisions may be based on different factors than are significant to different individual spectators.

There is a need in the art, therefore, for improved systems and methods of intelligent prioritization and manipulation of stream views.

DETAILED DESCRIPTION

Embodiments of the present technology include intelligent prioritization and manipulation of stream views. A game control system may determine a prioritized queue of data streams, wherein each data stream may be associated with a respective game view in an in-game environment. Evaluation of the data streams in real time may be based on in-game indicators identified in real time and associated with each respective game view. Determining the prioritized queue may be based on historical datasets associated with past in-game indicators for past prioritized game views and past in-game indicators for deprioritized game views. In addition, determining of the prioritized queue may further be based on a machine learning model that can receive datasets associated with in-game indicators and learn from the datasets as well. For example, when there is a manual override where a game view that is different from a model-determined prioritized game view is chosen over a model-determined prioritized game view, the machine learning model may be trained by a training module that receives datasets associated with the model-determined prioritized game view and the manually-selected game view and adjust weights at the machine learning model accordingly. The present technology thus addresses current problems in the art by allowing user inputs to override a model-determined prioritized game view and using associated datasets to teach the machine learning model, providing an improved system for generating a prioritized game view determined by in-game indicators.

The present technology provides a dynamic mechanism for propagating a prioritized game view to spectator devices. The dynamic nature of the game control system not only displays the prioritized game view in real-time as determined and defined by the machine learning model, but also allows user input to override the model-determined prioritized game view and teach the machine learning model to more accurately determine the appropriate prioritized game view over time. In some embodiments, the game control system may include a game client that is executed in a virtual machine to establish a camera character view that computer-controlled, within the in-game environment. Since it is same game control system that moves the camera character view based on in-game triggers in anticipation of events, the associated datasets also be provided to the machine learning model to efficiently supplement the in-game indicators. In some embodiments the disclosed technology is deployed in the context of a game control system having prioritizing capabilities and game engine features, among others.

Figure 1:
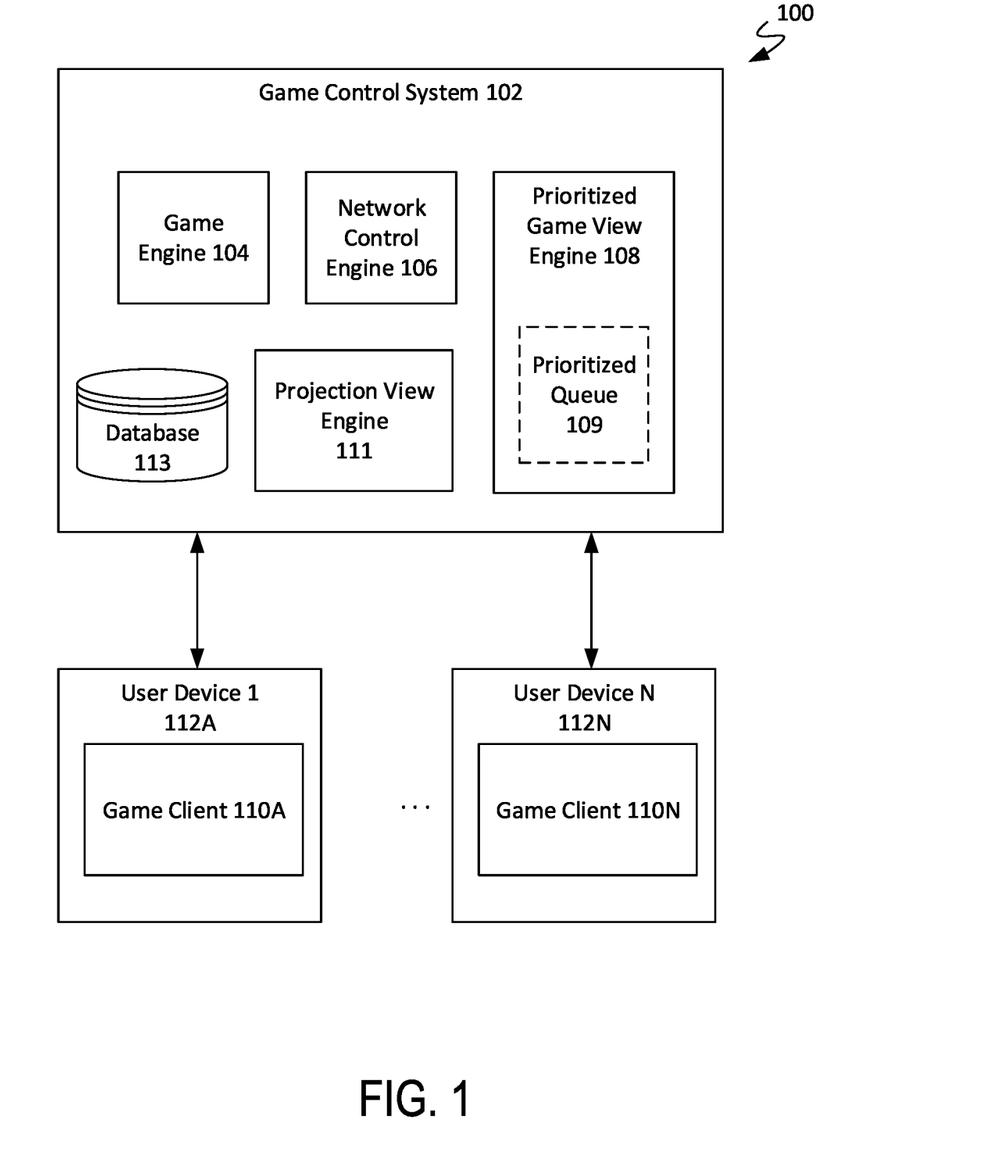
FIG. 1 illustrates an exemplary network environment in which a system for intelligent prioritization and manipulation of stream views may be implemented.

FIG. 1 illustrates an exemplary network environment 100 in which a system for intelligent prioritization and manipulation of stream views may be implemented. In game control environment 100, a game control system 102 may communicate with user devices 112A-112N each of which may be executing a respective instance of game client 110 during a session. Such game client 110 may correspond to the same session of the same game title, for example, so as to allow the users of user devices 112A-N to engage with each other within the in-game environment. In some embodiments, game client 110 may further be associated with a host server (not pictured) that hosts some or all of the services associated with the game session or game title.

The devices of network environment 100 may communicate using one or more communication networks known in the art, including any local, proprietary network (e.g., an intranet) and/or that may be a part of a larger wide-area network. The communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network allows for communication between the various components of network environment 100.

Game control system 102 may be configured to implement intelligent prioritization and manipulation of stream views associated with a session. For example, game control system 102 may receive and automatically evaluate multiple streams in real-time or near real-time in accordance with various rules and preferences. Such evaluation may further be used to manipulate the streams in accordance with the rules and preferences to generate a custom stream for one or more recipient devices. While some administrator or producer input may also be considered in generating a custom stream, such input may thereafter be stored (e.g., in conjunction with historical data regarding previous custom streams) and used to drive automated evaluation of subsequent session streams and generation of subsequent custom streams.

Figure 5:
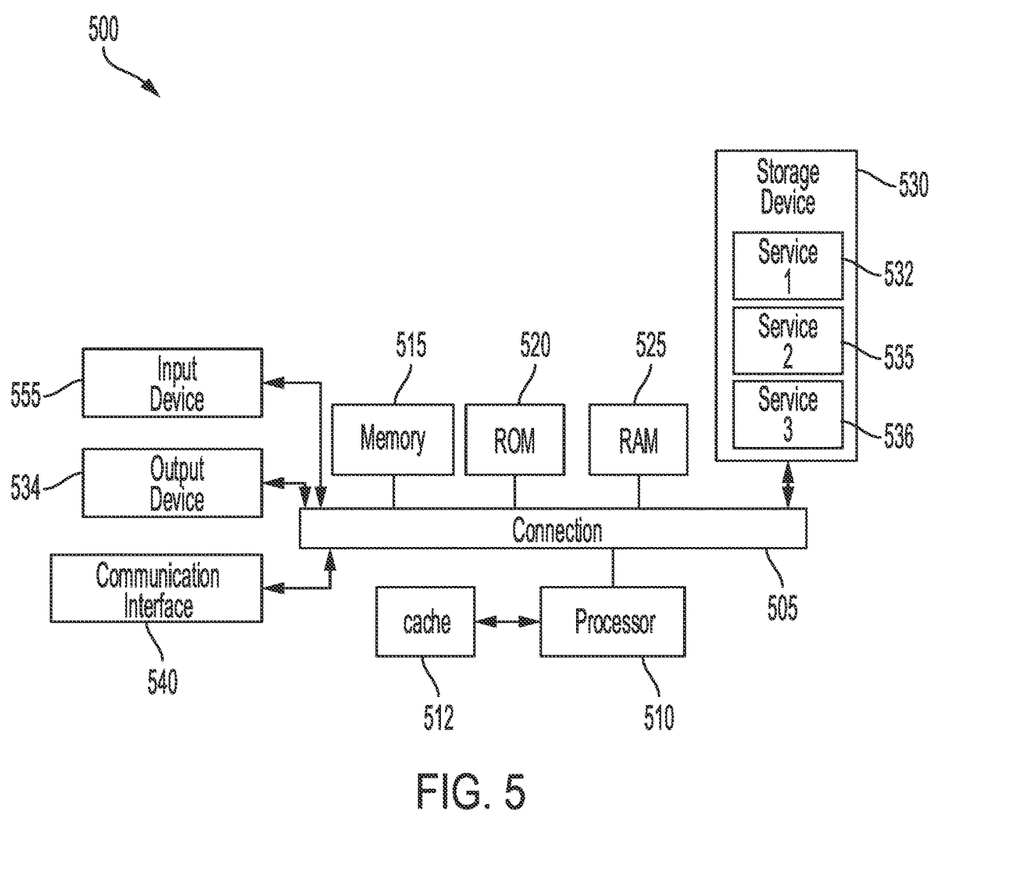
FIG. 5 is a block diagram of an exemplary computing device for implementing aspects of the present technology.

Game control system 102 may include one or more of a variety of computing devices known in the art, including that illustrated and described in relation to FIG. 5. For example, game control system 102 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. In some embodiments, the components of the game control system 102 (and their respective functions) may be implemented by one or more virtual machines, which may operate in whole or in part on-premises or in the cloud. As illustrated in FIG. 1, the game control system 102 may include a game engine 104, network control engine 106, prioritized game view engine 108 (associated with prioritized queue 109), projection view engine 111, and database 113.

Game engine 104 may be configured to serve as one of the authoritative source of game events in a current session (e.g., game session of a game title). For instance, the game engine 104 may receive and track the respective status of each player and associated characters or avatars within the digital or virtual environment of the game title. The respective status may include character locations within the in-game environment, benchmarks achieved by the player or character (e.g., in-game achievements, personal records), items obtained by the characters, character abilities, player rank within the session or tournament, etc.

The game engine 104 may receive game client information identifying user interactions with each user device from the game clients running on the user devices. User interactions can include pushing of particular keys on a keyboard, mouse movements, inputs on a controller, interacting with a touchscreen, voice input, and so on. The game engine 104 may process the game client information to determine updates to game events, such as the health of characters, position of characters, a score associated with the characters, and so on. After processing, the game engine 104 may also provide the updates back to the game clients 110A-N running on the user devices 112A-N. As such, the game engine 104 may maintain a consistent in-game environment for all users.

In some implementations, the game engine 104 may be used to register, create, and imbue attributes to a camera character designated to capture certain views of the digital environment. Although the camera character may be registered as a character within the session and thus associated with a stream from a specific perspective view within the digital environment, the character may further be imbued with unique attributes that facilitate view capture and that avoid detracting from regular in-game interactions. For example, the camera character may be imbued with invisibility, intangibility, invulnerability, ability to fly, ability to teleport, etc. Whereas other characters registered to play in the session may further be given a display of character status or other data (e.g., points, health, owned objects, messages), a display view associated with the camera character may be modified to remove such status information and messages.

In addition, the camera character may be moved in accordance with software executable to predict and detect in-game events of significance as defined and refined by rules and preferences. For example, a camera character may move or teleport to a different location based on predetermined triggers detected within the session. For example, one or more in-game triggers associated with a different location may be satisfied based on game information associated with a different location and/or other game views. An in-game trigger may be satisfied when, for example, a particular number of characters (e.g., 2, 3, 10) are located within a threshold proximity of each other. Similarly, an in-game trigger may be satisfied by determining that a user is approaching or has obtained a top user score, or a first place position, (e.g., in a racing game). Then the camera character may be moved to the different location based on the identified in-game triggers, and the camera character view may be a perspective view that displays aspects associated with the in-game triggers. Thus, the stream associated with the camera character may be among those being evaluated, and the view of the camera character may be used to supplement or otherwise obtain additional context for an in-game event for which there may be no other stream with a satisfactory or preferred view (e.g., birds-eye view of a large battle among numerous characters associated with only close-up views).

Network control engine 106 may maintain communications between the game control system 102 (and components thereof) and the user devices 112A-N. In some aspects, the network control engine 106 may be configured as a Dynamic Host Configuration Protocol server (DHCP server) that receives game connection requests from the user devices 112A-N and associates the user devices 112A-N with the game control system 102.

Figure 2A:
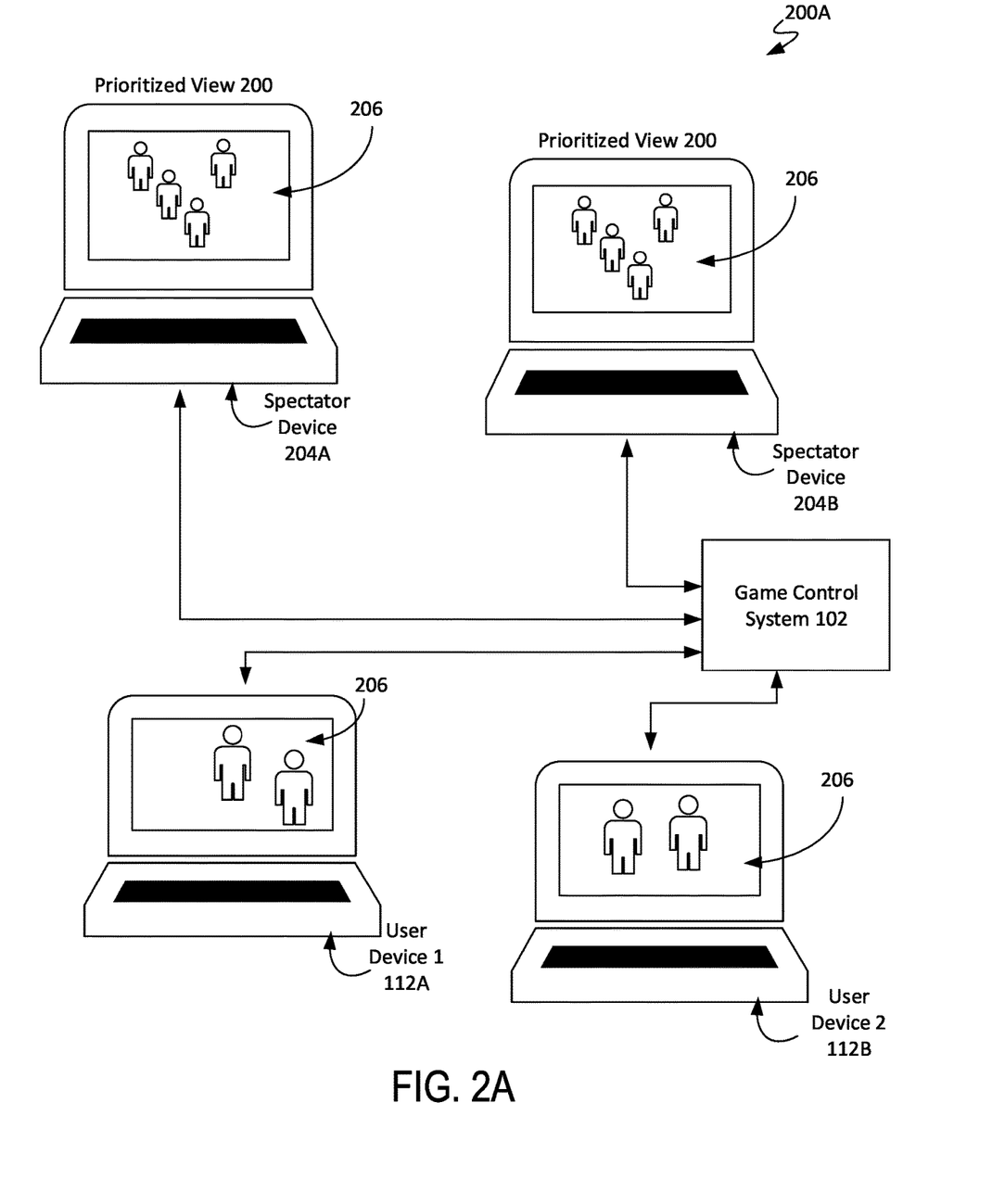
FIG. 2A illustrates an exemplary implementation of a system for intelligent prioritization and manipulation of stream views.
Figure 2B:
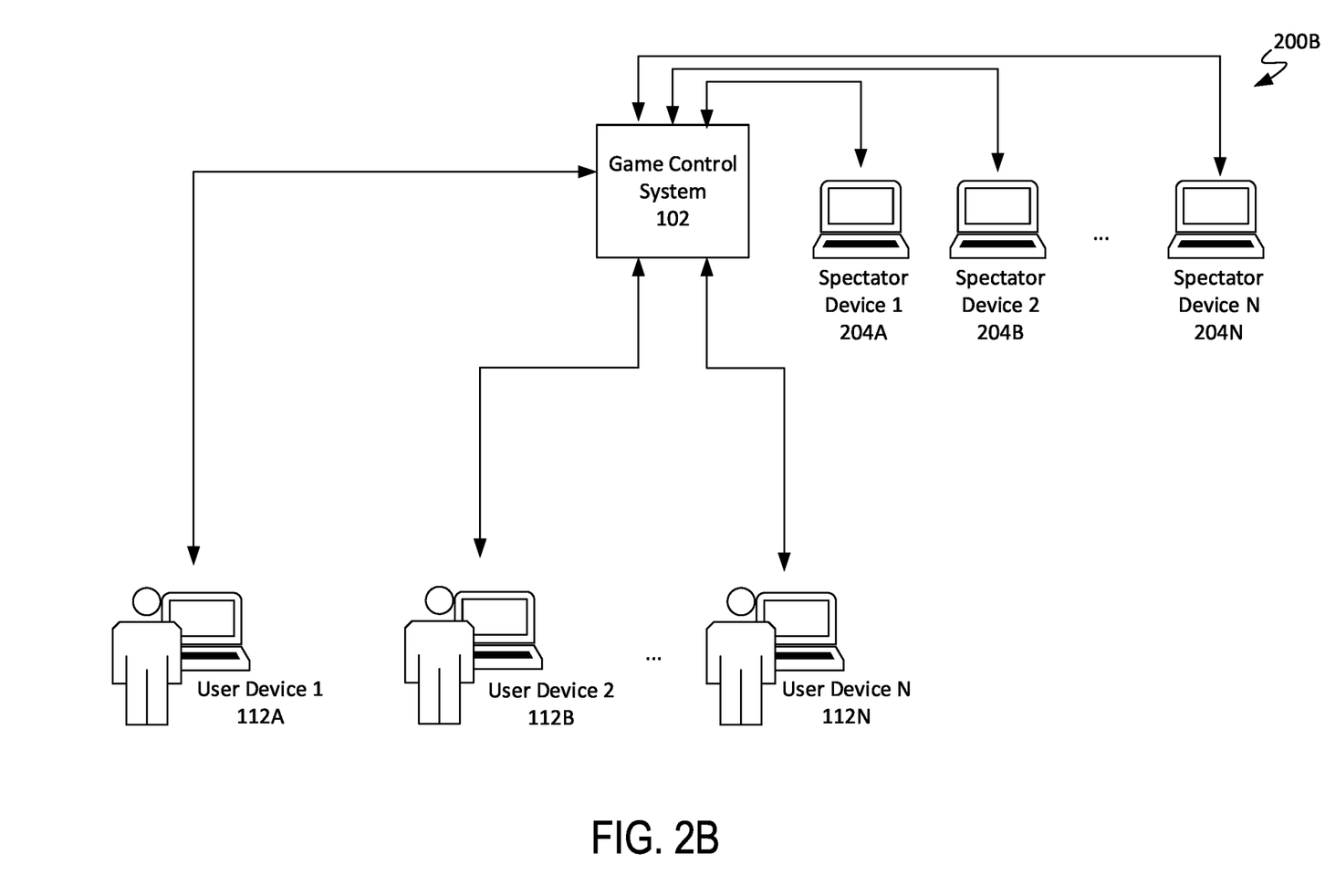
FIG. 2B illustrates another exemplary implementation of a system for intelligent prioritization and manipulation of stream views.

Prioritized game view engine 108 may evaluate incoming streams and generate a (custom) prioritized stream view 200 (described in further detail in relation to FIG. 2). Generation of the prioritized stream view 200 may be based on a prioritized queue 109 and provided for presentation to one or more spectator devices (e.g., user devices 112A-112N of FIG. 1-2B, spectator devices 204A-N of FIG. 2B). Evaluation of the incoming streams from user devices 112A-N and generation of a prioritized stream view 200 is further discussed in more detail herein with reference to FIGS. 2-4.

In some embodiments, game control system 102 may also include a projection view engine 111 that may generate or otherwise further modify custom views. For example, projection view engine 111 may generate custom overlays or interfaces to pair with a custom view generated by prioritized game view engine 108. Whereas the custom view generated by prioritized game view engine 108 may include a combination of the streams associated with user devices 112A-N (e.g., by way of combining into a combination display and/or switching), the custom overlay or interface generated by projection view engine 111 may provide additional context or functions that may also be customized to a spectator or audience of spectators. The respective content or functions of the overlay or interfaces may likewise be governed by predetermined rules and preferences (e.g., regarding players of interest, events of interest, types of preferred views). In some embodiments, other streams may also be incorporated into the stream of the prioritized view. Such streams may correspond to commentary or other content provided by commentators or other users.

The game control system 102 may also include one or more databases 113 that may store data associated with any of the above-mentioned aspects in the form of datasets. While a single database 113 is illustrated in FIG. 1, a variety of different databases may be used, including remote databases and network sources of data regarding the specific players, game titles, tournaments, etc., associated with the session or custom prioritized stream.

For example, the database 113 may store historical data regarding past view customizations, including customizations implemented in response to manual input or instructions. Such historical data may be used to automatically implement customizations, recommend and generate new or adjusted rules or preferences, update learning and training models, and provide context for evaluating the streams of a current session (e.g., predict when an in-game record is about to be broken or an in-game best is about to be achieved). Such historical data may also be incorporated flags or notifications to users or spectators, as well as display within the custom stream via overlays or other graphical interfaces.

In addition, database 113 may further store a variety of different rules and preferences, each identifying a set of session conditions (e.g., indicators, associated thresholds) and an associated customization. Rules or preferences may be defined for general purposes, as well as tailored to individuals. General purpose rules may apply to smooth transitions, maintaining a view associated with momentum (e.g., progression of indicators), and other factors associated with enhancing spectator experience. More individualized rules may be based on specific preferences of an individual spectator or a specific audience (e.g., friends and family of a particular player). Different rules may conflict, however, and thus, selection of the rules and preferences to apply may itself be part of the prioritization and customization decisions.

An exemplary rule may identify, for example, that when a highly-ranked player within a tournament or group of friends is within a threshold distance or number of points from achieving an in-game record, a view of that player's character is to be prioritized above a view of another player's character. Associated customizations may include zooming-in to obtain close-up views, zooming-out to obtain a birds-eye view, and/or combinations of different views of in-stream events associated with the achievement. In addition, a particular spectator may have expressly or implicitly indicated preferences regarding certain types of views, players, characters, objects, events, etc., of interest. Thus, the data stored by database 113 may be used to determine an order of stream views within the prioritized queue 109 and customization, as well as the bases for further analysis, pattern or trend detection, learning, generation of new rules, etc. In some embodiments, the database 113 may further store various prioritized queues, as well as streams identified as being of particular interest (e.g., previous in-game records) for ease of reference in customizing views (e.g., when records are broken).

The description above has described the game control system 102 as being associated with users playing in the same session of the same single game title. In some aspects, the game control system 102 may run multiple sessions through one or more game engines 104 and with dozens, up to even thousands, of user devices 112A-N in respective in-game environments of one or more game titles. In some aspects, the game control system 102 may execute multiple virtual machines for different spectators and audiences so as to evaluate different streams for the prioritized queue 109 and generation of the prioritized game view 200.

FIG. 2A illustrates an exemplary implementation of a system for intelligent prioritization and manipulation of stream views within network environment 200A. As illustrated, network environment 200A may include a game control system 102 in communication with user devices 110A and 110B, as well as spectator devices 204A and 204B. A first user device (e.g., user device 110A) may display a first game view of the virtual environment 206, for example, as viewed in association with a character controlled by the user device 110A. Similarly, a second user device (e.g., user device 110B) playing in the same session of the same game title may display a second game view of the virtual environment as viewed in association with a different character controlled by the user device 110B.

The game control system 102 (e.g., via prioritized game view engine 108) may evaluate the streams and associated views therein associated with each of the user devices 110A-B (as well as any streams associated with camera characters generated for the game session) in determining how to prioritize and manipulate the stream views for distribution to one or more spectator devices 204A-B.

Various rules or preferences may be used in prioritizing the streams and stream views. Such rules and preferences may be used to identify when a stream and associated view corresponds to a character or event of interest to one or more spectators. For example, one rule may specify that events involving gatherings of multiple characters within a specific proximity to each other may be assigned a higher priority than events involving fewer characters or characters that are at remote distances from each other. Another rule, which may be specific to a tournament and its ranking system, may specify that views of higher-ranked players be prioritized over views of lower-ranked players. Further, a spectator may have expressed certain view preferences or may be associated with a profile indicative of certain preferences.

Evaluation and prioritization in view of such rules and preferences may be performed by prioritized game view engine 108 in real-time (or near real-time) as the streams are received during the session. Further, such evaluation and prioritization may be applied to segments of the incoming streams. Thus, a segment of a particular stream may be prioritized and incorporated into a prioritized view when its associated views of the virtual environment (and associated characters, objects, and events) are highly prioritized. Over time, however, the priority of the particular stream may fall within an order in comparison to other prioritized streams. The prioritized game view engine 108 may therefore switch from a current segment of the first stream to a segment of another stream that has become more highly-ranked. Thus, the stream of the custom view generated by prioritized game view engine 108 may combine different segments of different streams, which may be presented sequentially or within a combined display. As illustrated in FIG. 2B, the same prioritized game view 200 of the session may be provided to the spectator devices 204A-B. Alternative embodiments, however, may allow for different views of the session to be individually prioritized according to rules or preferences specific to the individual spectator.

FIG. 2B illustrates another exemplary implementation of a system for intelligent prioritization and manipulation of stream views within network environment 200B. As illustrated, network environment 200B may include game control system 102 in communication with various user devices 112A-112N and various spectator devices 204A-204N. In an exemplary embodiment, a first set of user devices 112 may be associated with the same game session of the same game title, and a second set of user devices 112O may be associated with a different game session of the same or different game title.

Each of the sessions may therefore be associated with a set of streams associated with each of the players, as well as streams associated with one or more camera characters. Depending on the settings associated with each session, one or more custom streams may be generated and provided to one or more spectator devices. Certain esports tournaments, for example, may wish to distribute official custom streams; thus, the rules and preferences for custom stream generation may be provided by authorized administrators of the tournament. Alternatively, other online events may allow spectators to further personalize a custom view. For example, a spectator (e.g., of spectator device 204A) may be a fan of a particular player; thus, streams associated with views of the favored player may be prioritized more highly and incorporated more heavily into the custom stream for spectator device 204A than in custom streams generated for other spectators of spectator devices 204B-N.

Figure 3:
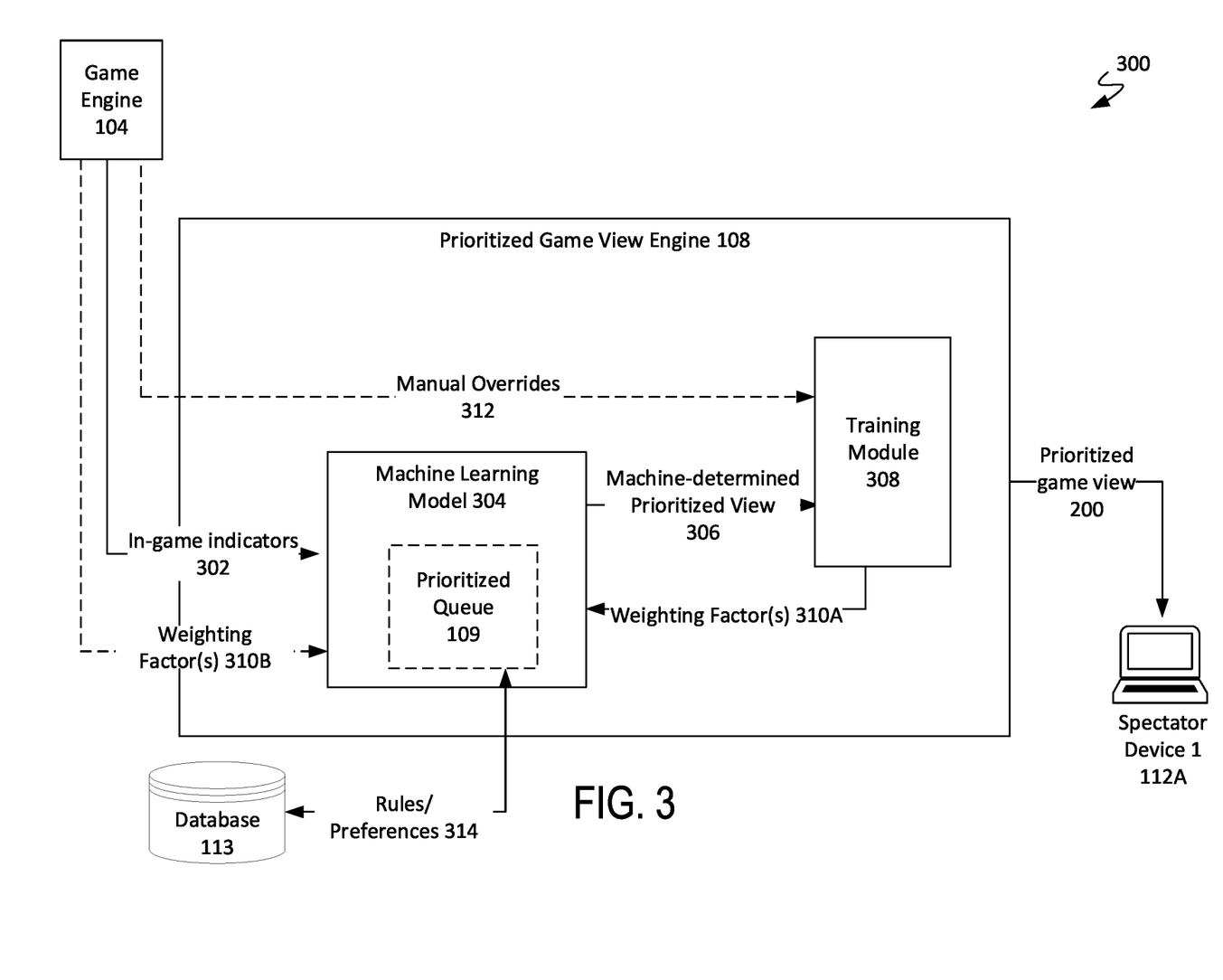
FIG. 3 is a block diagram of an exemplary system for intelligent prioritization and manipulation of stream views.

FIG. 3 is a block diagram of an exemplary system 300 for intelligent prioritization and manipulation of stream views. System 300 may correspond to prioritized game view engine 108 of FIG. 1. In particular, system 300 is concerned with using machine learning to learn from historical data regarding stream view prioritization and customization and to refine prioritization decisions over time.

As illustrated, prioritized game view engine 108 may be in communication with game engine 104, spectator device 112A, and database 113. Prioritized game view engine 108 may include a machine learning model 304 (associated with the prioritized queue 109) and training module 308. In particular, prioritized game view engine 108 may receive rules and preferences 314 from database 113, various streams from user devices 112A-N, and other stream data—including inter alia in-game indicators 302, weighting factors 310, and manual override instructions 312—that may be used to generate a prioritized game view 200 to spectator device 112A. Such data may further be used to learn and refine prioritization decisions (including any additional or adjusted weighting factors 310A) over time.

Machine learning model 304 of the prioritized game view engine 108 may receive in-game indicators 302 (or datasets associated with in-game indicators) from the game engine 104, weighting factors 310B from the game engine 104, and rules and preferences 314 from database. where the in-game indicators 302 may be associated with game views that are user-controlled and/or camera character views that are computer-controlled. The machine learning model 304 may include one or more algorithms executable independently or in combination to evaluate prioritization decisions currently and previously made by prioritized game view engine 108. Such evaluation by machine learning model 304 may be based on a weighted linear regression model, a weight-based decision tree model, a neural network model, other models known in the art, and combinations of the foregoing.

As such, the machine learning model 304 may evaluate the prioritized queue 109 in conjunction with datasets associated with the in-game indicators 302, current weighting factors 310, and rules and preferences 314. The prioritized queue 109 may provide a current order of priority from highest-ranked views to lowest-ranked views. When evaluated in conjunction with the other data, however, the machine learning model 304 may identify insights regarding the prioritization decisions—e.g., patterns, trends, and deviations therefrom—that indicate a need to adjust current rules, preferences, or parameters thereof.

According to some examples, the prioritized queue 109 determine a machine-determined prioritized game view 306 that may be transmitted to a training module 308 to adjust weighting factors 310A and to update the machine learning model 304 in view of the same. In addition, there may be one or more manual override instructions 312 that indicates a different game view is to be prioritized than is prioritized by the machine-determined prioritized game view 306. The manual override 312 may serve as a line cut based on an input from an operator of the game control system 102 or may be based on input from spectators, such as a determination and/or vote based on a majority of the spectators. In such a case, the training module 308 may adjust the weights 310A associated with a current rule or generate a new rule to account for the manual override 312. Thus, the next time the new or adjusted rule is found to applicable, the corresponding prioritization and customization decision may be made automatically rather than based on manual override 312.

In some embodiments, the prioritization may be initially based on requests or subscriptions to follow certain game views (e.g., celebrity players). Implementing such prioritization schemes may include generating a specific set of rules or preferences (or weighting factors 310) to be applied to streams provided to requesting or subscribing spectators. The prioritized game view 200 may be thereafter be propagated for display at one or more spectator devices 112A as shown in FIG. 3.

Figure 4:
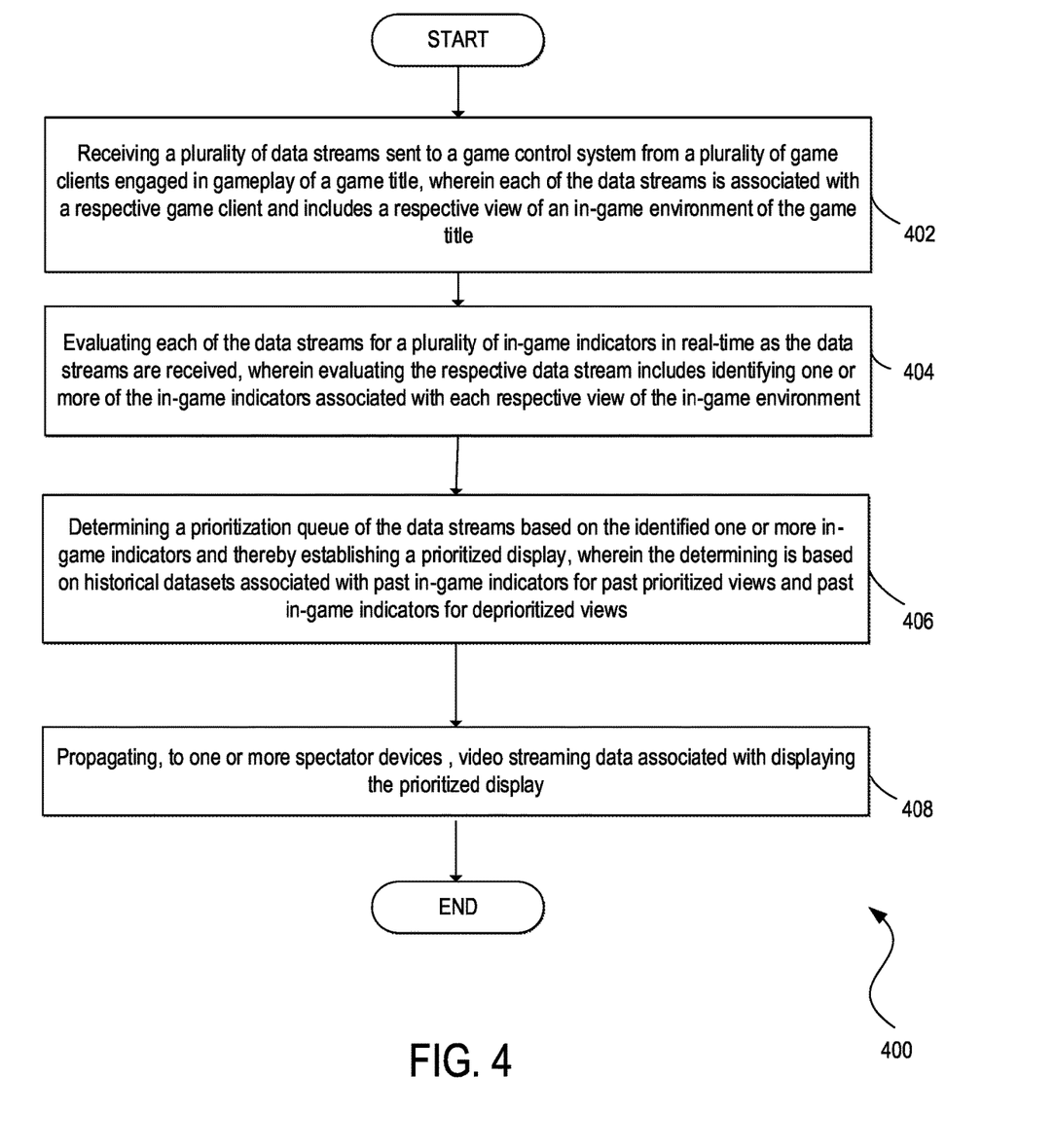
FIG. 4 is a flowchart illustrating an exemplary method for intelligent prioritization and manipulation of stream views.

FIG. 4 is a flowchart illustrating an exemplary method 400 for intelligent prioritization and manipulation of stream views. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 4 (and the order thereof) are exemplary and may include various alternatives, equivalents, or derivations thereof including but not limited to the order of execution of the same. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving a plurality of data streams sent to a game control system 102 from a plurality of game clients 110 engaged in gameplay of one or more game titles in block 402. Each of the data streams may be associated with a respective game client 110 and may include a respective game view of a digital environment (e.g., in-game environment 206 of the game title). For example, the game engine 104 illustrated in FIG. 1 and/or a processor 510 in FIG. 5 may receive the plurality of data streams sent to the game control system 102. One of more of the game client (e.g., 110A-110N) may be executed on user devices (e.g., user devices 112A-112N) as illustrated in FIG. 1.

According to some examples, the method includes evaluating each of the data streams for a plurality of in-game indicators (e.g., in-game indicators 302), or key performance indicators (KPIs), in real-time as the data streams are received block 404. According to some examples, the evaluating includes identifying one or more of the in-game indicators associated with each respective game view of the in-game environment 206. For example, the game engine 104 illustrated in FIG. 1, the prioritized game view engine 108 illustrated in FIG. 1, and/or the processor 510 illustrated in FIG. 5 may evaluate each of the data streams in block 404.

According to some examples, some of the in-game indicators 302 may be determined by computer vision and analysis of video pixel data of a streaming video displaying at a user device associated with one of the one or more game clients. For example, the video analysis may detect a particular motion, a pop-up window, or displayed text based on text recognition (e.g., changes to scores or other character status). For example, a game title may alert certain activities via pop-up windows, which may be used as one of the in-game indicators 302. According to some examples, some of the in-game indicators 302 may be in the form of metadata that describes the role of each character, the actions occurring, the situations that are imminent, or objects nearby associated with or visible in a user-controlled game view or a computer-controlled camera view. The metadata may be received through an API associated with the game title. For example, the metadata may include coordinates of the characters, which may then be averaged per team to determine where teams are with respect to one another.

According to some examples, the method includes determining a prioritized queue (e.g., prioritized queue 109) of the data streams based on the identified one or more in-game indicators in block 406. For example, the prioritized game view engine 108 illustrated in FIG. 1 and/or the processor 510 illustrated in FIG. 5 may determine the prioritized queue in block 406. According to some examples, the determining is based on historical datasets associated with past in-game indicators for past prioritized game views and past in-game indicators for deprioritized game views.

According to some examples, the method includes establishing a prioritized game view (e.g., prioritized game view 200) that is propagated to one or more spectator devices (e.g., spectator devices 204A-204N) based on the prioritized queue 109 of the data streams in block 408. For example, the prioritized game view engine 108 illustrated in FIG. 1 and/or the processor 510 illustrated in FIG. 5 may establish the prioritized game view. According to some examples, video streaming data associated with a top two or more of the data streams of the prioritized queue 109 may be propagated such that two or more game views may be displayed simultaneously at one or more spectator devices.

According to some examples, a determination that a currently-streaming segment of the prioritized game view has completed may be made and video streaming data associated with a next prioritized game view of the prioritized queue 109 may be propagated to one or more spectator devices when the prioritized queue 109 has not changed. Consequently, games view are not cut in the middle of a certain action, like when a golf ball has not come to a complete stop.

Alternatively, when the prioritized queue 109 has changed, then there may be a new prioritized game view that follows the completion of the currently-streaming segment of the prioritized game view 200, such that video streaming data associated with the new prioritized game view is propagated. For example, the processor 510 illustrated in FIG. 5 may determine that the currently-streaming segment of the prioritized game view 200 has completed and propagate video streaming data associated with the next prioritized game view of the prioritized queue 109. In addition, the processor 510 illustrated in FIG. 5 may further generate a graphical contextual transition clip regarding the prioritized game view 200 to be displayed before the prioritized game view 200 that introduces the prioritized game view 200.

In some embodiments, identifying one or more of the in-game indicators 302 may include extracting an associated dataset from the identified one or more in-game indicators. 302 Additionally, identifying one or more of the in-game indicators 302 may include providing the associated dataset to a machine learning model (e.g., machine learning model 304) that determines the prioritized queue 109. For example, the game engine 104 illustrated in FIG. 1 and/or the processor 510 illustrated in FIG. 5 may identify one or more of the in-game indicators and/or provide the associated dataset to the machine learning model.

According to some examples, determining the prioritized queue 109 may include receiving the associated dataset at the machine learning model 304 and determining a model-determined prioritized game view 306 and a model-determined prioritized queue of the data streams. The machine learning model 304 may be based on and utilize a linearized model and/or a neural network that has been optimized with provided datasets that indicate a baseline for determining the prioritized queue 109. For example, the machine learning model 304 illustrated in FIG. 3 and/or the processor 510 illustrated in FIG. 5 may determine a model-determined prioritized game view and a model-determined prioritized queue of the data streams. In addition, based on the provided datasets, it may be determined that certain in-game indicators carry more weight than others and thus, views associated more of the in-game indicators that carry more weight would rise in the prioritized queue, one of which would become a model-determined prioritized game view (e.g., model-determined prioritized game view 306).

According to some examples, certain variations of the machine learning model may be stored at the database (e.g., database 113) and retrieved based on a kind of game title or viewing experience for which a particular variation of the machine learning model is best suited. Furthermore, there may be a configuration tool for selecting which game title that the game engine 104 may be serving as a game server for, to select the associated variation of the machine learning model and to even manually adjust certain weights for a more customized experience.

According to some examples, determining the prioritized queue 109 may include providing datasets associated with the model-determined prioritized game view 306 to a training module (e.g., training module 308), determining whether or not there is a manual override (e.g., manual override 312), and adjusting one or more weights based on the model-determined prioritized game view. For example, the machine learning model 304 illustrated in FIG. 3, the training module 308 illustrated in FIG. 3, and/or the processor 510 illustrated in FIG. 5 may provide datasets associated with the model-determined prioritized game view to the training module, determine whether or not there is a manual override, and/or adjust one or more weights based on the model-determined prioritized game view.

According to some examples, the manual override 312 may negatively adjust one or more positive weights associated with data points associated with the one or more in-game indicators 302 associated with the model-determine prioritized game view 306. The manual override 312 may also positively adjust one or more additional weights associated with data points associated with one or more in-game indicators associated with a manually selected view. For example, the training module 308 illustrated in FIG. 3 and/or the processor 510 illustrated in FIG. 5 may negatively and/or positively adjust one or more weights.

According to some examples, game views that are determined to be a top certain number of ranks of the prioritized queue 109 may be stored and banked in a database (e.g., database 113) when the top certain number of ranks of a new prioritized queue are scored, by the machine learning model 304, to be lower than a certain threshold. Therefore, spectators may be given an option to be shown game views that was outranked by other simultaneously streaming prioritized game view but that score higher than all the currently streaming prioritized game views.

According to some examples, one or more of the game clients may be executed on one or more virtual machines of the game control system 102. For example, the computer-controlled game client may establish a camera character view at a location within the in-game environment 206, and the camera character view may be controlled by the game control system 102 through the virtual machine. Furthermore, the computer-run game client may omit status data created for the camera character by the respective game title from the camera character view. For example, the processor 510 in FIG. 5 may receive executed one or more game clients on one or more virtual machines of the game control system.

According to some examples, generating the camera character view may include identifying one or more in-game triggers that have been satisfied based on the respective game information of one or more user-controlled characters. The in-game triggers may be associated with a different location in the in-game environment 206. The camera character may further be moved to the different location based on the identified triggers, wherein the moved camera character is associated with a view of the different location. Then, an updated projection view of the different location associated with the moved camera character at the different location may be generated. The in-game triggers may signify that the camera character view is showing or approaching a predetermined item, goal, opportunity, or location with a designated importance within the respective in-game environment 206.

FIG. 5 is a block diagram of an exemplary computing device 500 for implementing aspects of the present technology. Computing device 500, which can be, for example, any computing device making up the user devices (e.g., user devices 112A-112N), the spectator devices (e.g., spectator devices 204A-204N), or the game control system 102, and any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 535, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 555, which can represent any number of input mechanisms, such as a microphone for speech, a touch-sensitive screen for gesture or graphical input, keyboard, mouse, motion input, speech, etc. Computing system 500 can also include output device 534, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 534, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for generating prioritized stream views, the method comprising:
   receiving a plurality of data streams sent to a control server over a communication network from a plurality of client devices engaged in a session of a content title, wherein each of the data streams is associated with a respective client device and includes a respective view of a virtual environment of the content title, wherein one of the data streams associated with the session corresponds to a view of the virtual environment by a camera character controlled via a virtual machine, wherein status data associated with the camera character is omitted from the view of the virtual environment by the camera character;
   evaluating each of the data streams for a plurality of predetermined indicators in real-time as the data streams are received, wherein evaluating each respective data stream includes identifying one or more of the indicators present within each respective view of the virtual environment;
   determining a prioritized queue of the data streams based on a comparison of the identified indicators in each of the data streams and historical datasets associated with past prioritized views;
   generating a prioritized view of the virtual environment that includes a plurality of segments selected from among the plurality of data streams according to the prioritized queue;
   providing a stream of the prioritized view to a spectator device over the communication network; and
   controlling movement of the camera character within the virtual environment based on other data streams, wherein the camera character is moved from a first location to a second location to view one or more of the indicators present in the virtual environment but not present within the respective view of the other data streams.

2. The method of claim 1, wherein generating the prioritized view further comprises:
   determining that a first segment of a first one of the data streams has completed when a priority of the first data stream has fallen within an order of the prioritized queue; and
   switching to a second segment of a second one of the data streams according to the order of the prioritized queue.

3. The method of claim 1, wherein generating the prioritized view further comprises combining two or more of the data streams within a single display.

4. The method of claim 1, wherein determining the prioritized queue is further based on a machine learning model that applies one or more rules or preferences to the data streams, each rule or preference specifying one or more conditions and an associated prioritization or customization.

5. The method of claim 4, further comprising updating the machine learning model over time based on input from one or more sources, the input indicating a change to one of the conditions or the associated prioritization or customization specified by one of the rules.

6. The method of claim 5, wherein updating the machine learning model includes adjusting one or more weighting factors associated with the rule.

7. The method of claim 1, wherein identifying the indicators includes analyzing video pixel data associated with the data streams, and matching the video pixel data to stored data regarding the indicators.

8. The method of claim 1, wherein evaluating each of the data streams further includes making a prediction that one or more of the indicators are likely to appear within a respective view of one of the data streams.

9. The method of claim 1, further comprising generating a graphical contextual interface regarding the one or more of the segments selected for the prioritized view, and incorporating the graphical contextual interface within the stream provided to the spectator device.

10. A system for generating prioritized stream views, the system comprising:
    a control server that receives a plurality of data streams sent over a communication network from a plurality of client devices engaged in a session of a content title, wherein one of the data streams associated with the session corresponds to a view of a virtual environment by a camera character controlled via a virtual machine, wherein status data associated with the camera character is omitted from the view of the virtual environment by the camera character; and
    a prioritized view engine associated with the control server and executable by a processor to:
        evaluate each of the data streams for a plurality of predetermined indicators in real-time as the data streams are received, wherein evaluating each respective data stream includes identifying one or more of the indicators present within each respective view of the virtual environment;
        determine a prioritized queue of the data streams based on a comparison of the identified indicators in each of the data streams and historical datasets associated with past prioritized views;
        generate a prioritized view of the virtual environment that includes a plurality of segments selected from among the plurality of data streams according to the prioritized queue;
        provide a stream of the prioritized view to a spectator device over the communication network; and
        control movement of the camera character within the virtual environment based on other data streams, wherein the camera character is moved from a first location to a second location to view one or more of the indicators present in the virtual environment but not present within the respective view of the other data streams.

11. The system of claim 10, wherein the prioritized view engine generates the prioritized view by:
    determining that a first segment of a first one of the data streams has completed when a priority of the first data stream has fallen within an order of the prioritized queue; and
    switching to a second segment of a second one of the data streams according to the order of the prioritized queue.

12. The system of claim 10, wherein the prioritized view engine generates the prioritized view by combining two or more of the data streams within a single display.

13. The system of claim 10, wherein the prioritized view engine determines the prioritized queue further based on a machine learning model that applies one or more rules or preferences to the data streams, each rule or preference specifying one or more conditions and an associated prioritization or customization.

14. The system of claim 13, wherein the control server further updates the machine learning model over time based on input from one or more sources, the input indicating a change to one of the conditions or the associated prioritization or customization specified by one of the rules.

15. The system of claim 14, wherein the control server updates the machine learning model by adjusting one or more weighting factors associated with the rule.

16. The system of claim 10, wherein the prioritized view engine identifies the indicators by analyzing video pixel data associated with the data streams, and matching the video pixel data to stored data regarding the indicators.

17. The system of claim 10, wherein the prioritized view engine evaluates each of the data streams by making a prediction that one or more of the indicators are likely to appear within a respective view of one of the data streams.

18. The system of claim 10, wherein the prioritized view engine further generates a graphical contextual interface regarding the one or more of the segments selected for the prioritized view, and incorporates the graphical contextual interface within the stream provided to the spectator device.

19. A non-transitory, computer-readable storage medium having embodied thereon a program executable by a processor to perform a method for generating prioritized stream views, the method comprising:
    receiving a plurality of data streams sent to a control server over a communication network from a plurality of client devices engaged in a session of a content title, wherein each of the data streams is associated with a respective client device and includes a respective view of a virtual environment of the content title, wherein one of the data streams associated with the session corresponds to a view of the virtual environment by a camera character controlled via a virtual machine, wherein status data associated with the camera character is omitted from the view of the virtual environment by the camera character;
    evaluating each of the data streams for a plurality of predetermined indicators in real-time as the data streams are received, wherein evaluating each respective data stream includes identifying one or more of the indicators present within each respective view of the virtual environment;
    determining a prioritized queue of the data streams based on a comparison of the identified indicators in each of the data streams and historical datasets associated with past prioritized views;
    generating a prioritized view of the virtual environment that includes a plurality of segments selected from among the plurality of data streams according to the prioritized queue;
    providing a stream of the prioritized view to a spectator device over the communication network; and
    controlling movement of the camera character within the virtual environment based on other data streams, wherein the camera character is moved from a first location to a second location to view one or more of the indicators present in the virtual environment but not present within the respective view of the other data streams.

* * * * *